Sept. 3, 1940.  F. M. GUY  2,213,277
UNIVERSAL JOINT
Filed June 2, 1938   2 Sheets-Sheet 1
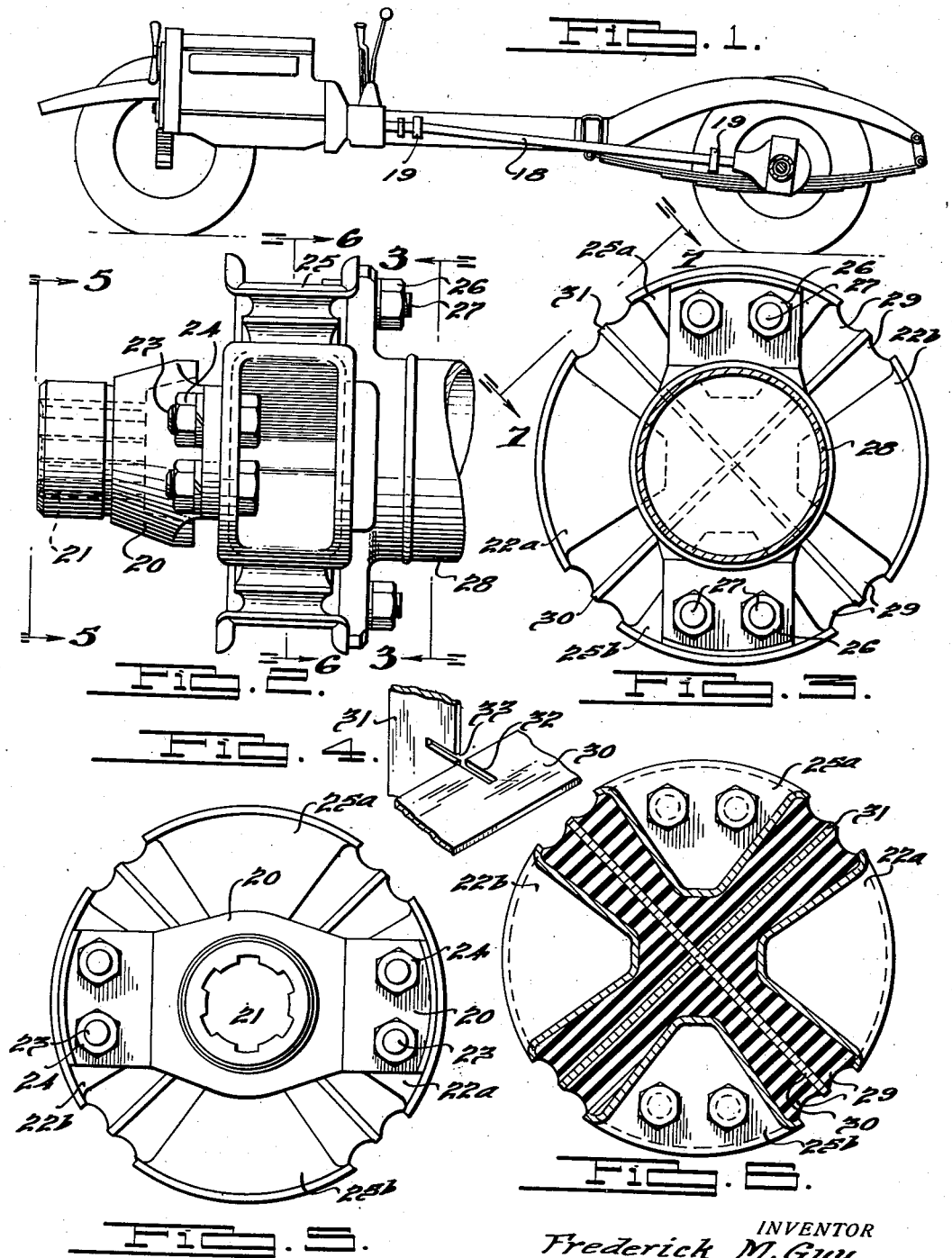
INVENTOR
Frederick M. Guy.
BY Dike, Calver & Gray
ATTORNEYS.

Sept. 3, 1940. F. M. GUY 2,213,277
UNIVERSAL JOINT
Filed June 2, 1938 2 Sheets-Sheet 2
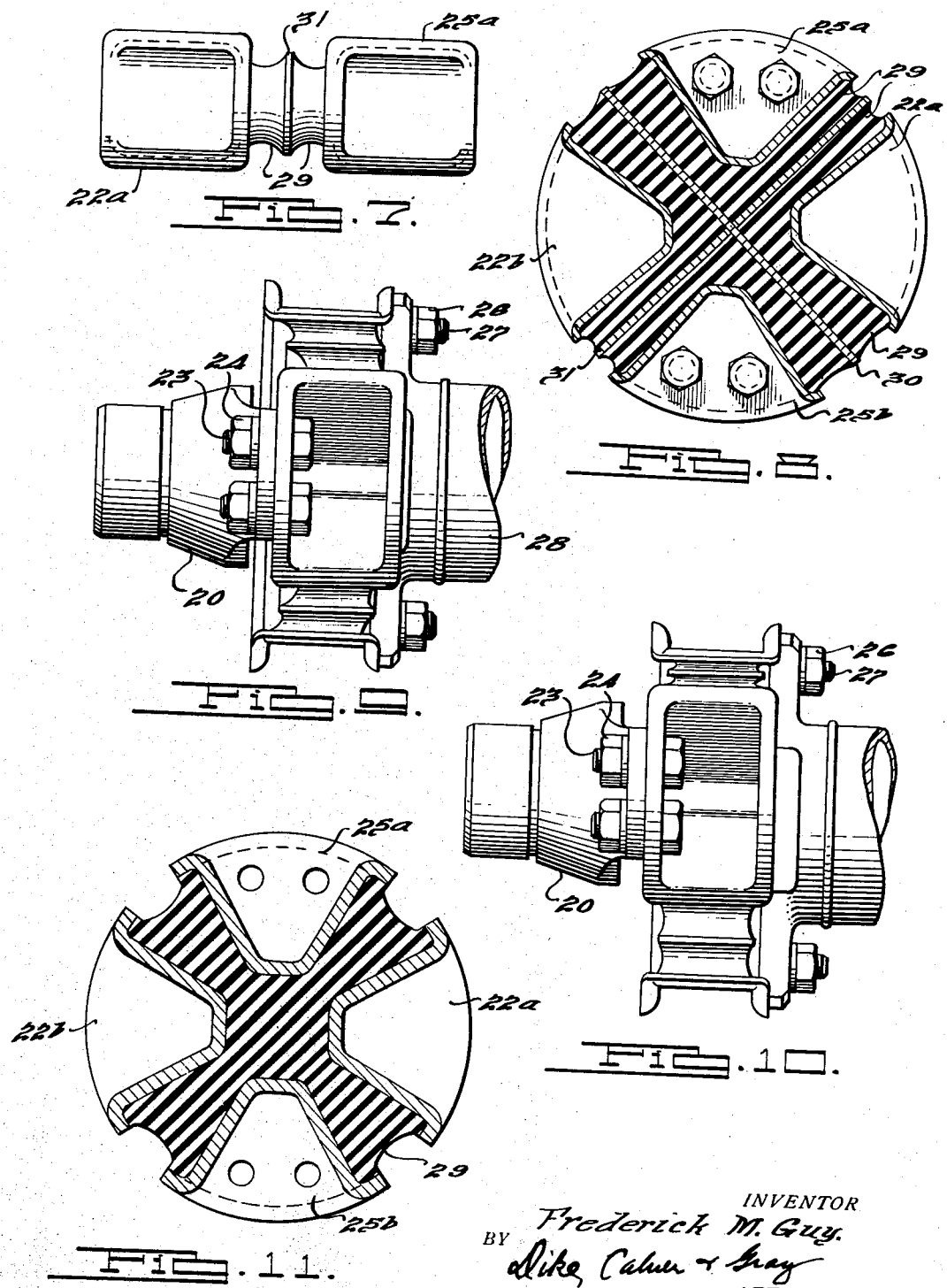
INVENTOR
Frederick M. Guy.
BY Dike, Calver & Gray
ATTORNEYS.

Patented Sept. 3, 1940

2,213,277

UNITED STATES PATENT OFFICE 2,213,277

UNIVERSAL JOINT

Frederick M. Guy, Detroit, Mich., assignor to Guy and Murton, Incorporated, Detroit, Mich., a corporation of Michigan Application June 2, 1938, Serial No. 211,397

8 Claims. (Cl. 64—14)

This invention relates to universal couplings adapted for use between connected abutting shafts and more particularly to such couplings in which various misalignments of the connected shafts are permitted by working of a resilient connection in the coupling interposed between the shafts.

It is an object of the present invention to provide a universal coupling having a resilient driving connection between the shafts, which coupling is of a compact design and relatively small in size and which has an increased power and torque transmitting capacity per unit length of its radius, without substantial impairment of the resiliency of the resilient element utilized therein.

Another object of the invention is to provide a universal coupling of the above character which is economical to manufacture and which is adapted for mass production manufacture, the construction utilizing a relatively small number of parts, many of which are interchangeable.

A further object of the invention is to provide a resilient universal coupling which is easy to assemble, service, repair and install.

A further object of the invention is to provide a universal coupling embodying a resilient member which accommodates relative misalignment of the connected shafts through distortion of the resilient element, thereby eliminating frictional wear of movable mechanical elements as well as necessity for lubrication of the coupling.

A further object of the invention is to provide a coupling having a resilient member comprising a single core maintained in a predetermined position between and within supporting members secured to the connected abutting shafts, thereby eliminating the necessity for a plurality of separate resilient blocks and retaining and connecting members.

A still further object of the invention is the provision of metallic supporting parts embedded within the resilient material in order to increase its tensile strength, without increasing the size of the coupling.

Other objects of this invention will appear in the following description and appended claims, reference being had to the accompanying drawings forming a part of this specification wherein like reference characters designate corresponding parts in the several views.

Fig. 1 is a side elevation, partially in cross section, of a motor vehicle chassis showing universal couplings embodying my invention attached to the drive shaft of the vehicle.

Fig. 2 is a side elevation of a universal coupling embodying the present invention.

Fig. 3 is an end view of the coupling taken substantially along lines 3—3 of Fig. 2 in the direction of the arrows.

Fig. 4 is a partial view in perspective of the supporting parts embedded within the resilient member; in particular showing the position of the slits therein and indicating a preferred method of interlocking these parts.

Fig. 5 is an end view of the coupling taken substantially along line 5—5 of Fig. 2 in the direction of the arrows.

Fig. 6 is an end view of the coupling in cross section taken substantially along line 6—6 of Fig. 2 in the direction of the arrows.

Fig. 7 is a partial side elevation, taken substantially along line 7—7 of Fig. 3 showing the fastening together of two of the carrying members by means of the resilient joint. The flanges, their connections, and the shafts are not shown.

Fig. 8 is an end view in cross section showing the coupling when the shafts are subjected to a torque load caused by a clockwise rotation of the connected driving shaft.

Fig. 9 is a view showing the coupling when the connected shafts are subjected to end thrust.

Fig. 10 is a view showing the coupling in the condition created by a transverse misalignment of the connected shafts, their axes remaining parallel.

Fig. 11 is an end view, in section, of a coupling embodying a variation of the present invention in which the supporting parts embedded within the resilient member thereof are omitted.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

A coupling constructed in accordance with the present invention comprises, generally, two hubs having flanges extending transversely of the shafts. If desired, one or both of the said hubs may be integrally formed on the ends of the respective shafts. Such a construction is indicated in regard to the driven shaft in Fig. 2. However, any suitable fastening means may be employed to connect the flanges with the shafts, such as through splines, a key and slit, a set screw, and the like or similar connecting elements.

In the embodiment of the invention shown in the drawings, each of the aforementioned flanges is secured to two substantially quadrant shaped members or sectors, 22a, 22b, 25a and 25b, which, as shown, are open outwardly to provide relatively thin walls, the same extending substantially parallel to the axis of the shaft and spaced at opposite ends thereof. The said flanges and their appurtenant members 22a, 22b, 25a and 25b are so positioned that the said members on one shaft enter into the spaces between those connected to the other shaft. These members when assembled thereby form separated quadrant sectors of a hollow cylindrical central body portion of the coupling. Between the said members is provided a resilient block or core which is securely attached by bonding or otherwise to the surface of the said sectors in such a way that relative movement between the surface of the sectors and the surface of the resilient block is eliminated. As the two rigid parts of the coupling are secured to the respective ends of the shafts as explained above, the connection therebetween is through the said resilient element.

However, it is to be expressly understood that the cylindrical central body portion of the coupling, mentioned above, may be composed of more or less than four parts. In other words, the respective flanges may have more or less than two members secured to them, provided, however, that these members are so fastened to the flanges that those connected to one flange alternately fit into spaces between those connected to the other.

The invention will be discussed hereinafter with particular reference to its function in connecting the main transmission shaft and the drive shaft of a motor vehicle, since such use of the coupling demonstrates a wide variety of conditions which must be met by it. In such an embodiment the drive shaft 18 (Fig. 1) is integrally connected with the coupling, indicated generally at 19, and may be externally splined to engage an internally splined hub 20 forming a part of the coupling.

Referring to the drawings and particularly to Fig. 2, 20 designates the flanged hub mentioned. The reference character 21 indicates the internal splining of the said hub. These splines are shaped and placed to fit those of a driving shaft (not shown) designed to fit thereinto so that the entire universal joint may be securely fastened to said shaft. However, any suitable securing means may be employed. Fastened to the hub 20 on opposite sides thereof are two members 22a and 22b, which resemble quadrants of a cylinder in shape. Bolts 23 and nuts 24, or equivalent fastening means, are employed to so secure them. These members are fastened so that their outer arcuate rims fit flush with the adjacent edge of the hub 20 while their converging sides extend in the direction of the center of the hub.

Another set of members 25a and 25b, similar to members 22a and 22b in size and shape, are secured to a driven flanged hub 28 by nuts 26 and bolts 27 or by some similar means. Each of the quadrant-like members 22a, 22b, 25a and 25b may have an annular rim portion extending about its periphery as indicated at 25 (Fig. 2).

Flange members 20 and 28 are maintained substantially perpendicularly to and spaced from each other by the respective quadrant-like or substantially V-shaped members secured to them. These said members fit in adjacent but spaced positions from each other as if forming respective quadrant sectors of a hollow cylinder. A cylindrical central portion of the universal joint is thereby created. This central portion, however, is divided by four crevices resulting from the aforementioned spaces between the members 22a, 25a, 22b and 25b. These crevices extend from the periphery of the cylindrical body portion into the hollow center thereof. Within these crevices and also within the said hollow central section, a resilient element 29 is situated. This element may be composed of any resilient substantially incompressible material, preferably resilient rubber, plastic, or the like. It is firmly secured to the edges and ends of the various quadrant sectors, thereby securely fastening them yieldably together. Consequently, the resilient elements 29 form a core within the cylindrical central portion of the universal coupling and unifies it through connecting its driving and driven sections, that is, by forming a fastening part between the driving flange 20 and its appurtenant members 22a and 22b, and the flange 28 and its appurtenant members 25a and 25b which are driven.

The driven flange 28 may be integrally formed upon a driven shaft, as indicated in the drawings, or it may be fastened to such a shaft by other suitable means known in the art and mentioned in connection with the driving shaft.

Within the aforementioned resilient central core 29 is a cross shaped supporting member composed of two interlocked perpendicularly positioned flat strips 30 and 31 of material such as steel or the like. These members are laterally slitted for half of their width at a point equidistant from each of their respective ends, said slits 32 and 33 being slightly wider than the thickness of the members 30 and 31. This construction allows the formation of a symmetrical cross shaped unit when the said members 30 and 31 are locked together by dovetailing them by means of the slits 32 and 33 in the manner indicated by Fig. 4. Any other type of suitable supporting member could be used in place of the core 29, such for example as a single piece appropriately shaped, a plurality of pieces fastened together, etc. The resilient core 29 is fastened by bonding, vulcanizing, or the like, to all of the surfaces of parts 30 and 31, or to its substituted member or members, in a way similar to its fastening to members 22a, 22b, 25a and 25b. However, my concept includes devices containing no supporting member, since the resilient core 29 may serve its purposes without such strengthening. This variation is depicted in Fig. 11.

It will now be clear, in view of the foregoing, that with the aid of my novel universal coupling it is possible to connect two abutting shafts for transmitting high torsional loads and to provide for their smooth operation under conditions of changing angular speeds and various types of axial misalignment. From an examination of Fig. 8, it will be seen that when the coupling is in operation the torque load is taken by the resilient core 29 and the same is compressed and stretched in the manner there indicated. The bonded surfaces of rubber and metal are subjected to a negligible amount of shear or other forces tending to produce relative sliding of these said surfaces.

Figs. 9 and 10 illustrate the relative positions of the structural elements of the coupling and the shape assumed by the resilient core 29 when the axes of the connected shafts are misaligned. Fig. 9 shows the relative positions of the parts when subjected to end thrust. Fig. 10 illustrates the relative positions of the parts to accommodate lateral displacement of the shafts. The shafts are indicated as moved laterally to each other but retaining a substantially parallel relationship of their axes.

Although in actual operative conditions any combination of the above described misalignments may occur, the same is provided for by distortion of the resilient element 29. For example, the shafts may be thrust together and also forced laterally out of line. Under these conditions the resilient element 29 and the structural parts of the coupling would assume positions comprising a composite of those depicted in Figs. 9 and 10. By way of further example, it will be seen that longitudinal misalignment, that is, the position which the abutting shafts assume when they remain in the same plane laterally but at an angle to each other, may take place within limits because the resilient element provides freedom of movement in every direction as indicated.

Thus, considered from one of its broader aspects my invention contemplates providing a novel universal coupling in which torsional loads transmitted thereby subject the resilient member to both compression forces and to tension strains without subjecting the surfaces thereof to appreciable shearing stresses. Since rubber is essentially noncompressible, the compression forces cause the rubber to flow and thus provide an increased amount of rubber at the points where the said resilient element is subjected to increased tension strains. An examination of Fig. 8 emphasizes this latter feature of my invention.

I claim:

1. A resilient coupling adapted to flexibly connect a driving shaft and a driven shaft and comprising flanges normally disposed in substantially parallel planes adapted for connection to adjacent shaft ends and having opposed alternating driving and driven members substantially in the form of spaced outwardly open radial sectors having unobstructed interiors lying in a common plane, and a resilient driving element disposed between said spaced sectors and secured thereto whereby relative movement of the driving and driven members and the connected shafts is accommodated by distortion of said driving element.

2. A resilient coupling adapted to flexibly connect a driving shaft and a driven shaft and comprising flanges adapted for connection to adjacent shaft ends and having opposed alternating driving and driven members substantially in the form of spaced outwardly open radial sectors having unobstructed interiors lying in a common plane, a resilient cross member disposed between said spaced sectors and comprising a metallic reinforcing member having a body of rubber bonded thereto and secured to the adjacent surfaces of said spaced sectors whereby relative movement of the driving and driven members and the connected shafts is accommodated by distortion of said driving element.

3. In a resilient coupling, the combination of driving and driven members adapted to be connected to a driving and driven shaft respectively and comprising metal outwardly open unobstructed radial sectors having relatively thin walls lying in a common plane and spaced from each other, a resilient driving connection disposed in the spaces between said driving and driven members and comprising a rubber cross member bonded to the surfaces thereof and conforming in size and shape to the spaces between said driving and driven members.

4. In a resilient coupling, the combination of driving and driven members adapted to be connected to a driving and driven shaft respectively and comprising metallic outwardly open radial sectors having unobstructed interiors lying in a common plane and spaced from each other, a resilient driving connection disposed in the spaces between said driving and driven members and comprising a rubber cross member bonded to the surfaces thereof and conforming in size and shape to the spaces between said driving and driven members, and a reinforcing member comprising two crossed and interlocked metal strips spaced from said radial sectors and embedded in said rubber cross member.

5. In a universal coupling for connecting abutting shafts to provide for angular, parallel and longitudinal misalignment, a plurality of radially disposed members, each of which resembles a sector of a cylinder in shape, said members being outwardly open and alternately secured about each of two outwardly extending flanges and maintained in positions adjacent each other but spaced therefrom, said members also having unobstructed interiors thereby forming a hollow substantially cylindrically shaped portion of said coupling containing a crevice between each pair of the said members, said crevices extending from the periphery of the said cylindrical portion to the central space therein and a resilient driving element secured in said crevices to adjoining surfaces of said members.

6. A universal coupling for connecting two abutting shafts comprising a plurality of rigid longitudinally extending outwardly open quadrant shaped members having unobstructed interiors spaced about one shaft and detachably secured to the end thereof; a plurality of similar detachable members secured to the end of the second shaft and arranged in alternating relation to the members secured to the first shaft; and a resilient driving connection interposed between the said members and secured thereto to provide a yieldable driving connection between said shafts.

7. A universal coupling for connecting two abutting shafts comprising two transversely extending flanges secured to the abutting ends of the said shafts respectively; a plurality of outwardly open rigid members having unobstructed interiors equidistantly spaced between said flanges and detachably secured alternately to the first and to the second of said flanges; and a rubber driving member interposed between the said members and bonded thereto, whereby a resilient driving connection is provided between said shafts.

8. A universal coupling for connecting two abutting shafts to provide for angular, parallel and longitudinally misalignment thereof, comprising two laterally extending flanges secured to the respective shafts; a plurality of outwardly open thin walled members each of which has an unobstructed interior and resembles a sector of a cylinder in shape, said members being alternately and removably secured about each of the said flanges so that they are maintained in positions adjacent each other but spaced slightly therefrom, thereby forming a hollow cylindrically shaped portion of the said coupling containing a crevice between each pair of the said members, said crevices extending from the periphery of the said cylindrical portion into the central space therein; a rubber core having a plurality of longitudinal fin-shaped portions equal in number to the said crevices and extending thereinto, said core being bonded in said crevices to the adjacent surfaces of each of the said members, to provide a resilient driving connection between said shafts.

FREDERICK M. GUY.